United States Patent
Xu et al.

(10) Patent No.: US 9,386,442 B2
(45) Date of Patent: *Jul. 5, 2016

(54) METHOD AND APPARATUS FOR PERFORMING MEMBERSHIP VERIFICATION OR ACCESS CONTROL IN WIRELESS COMMUNICATION SYSTEM

(71) Applicant: LG ELECTRONICS INC., Seoul (KR)

(72) Inventors: Jian Xu, Gyeonggi-do (KR); Kyung Min Park, Gyeonggi-do (KR); Jin Sook Ryu, Gyeonggi-do (KR); Sung Hoon Jung, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/878,441

(22) Filed: Oct. 8, 2015

(65) Prior Publication Data

US 2016/0057612 A1 Feb. 25, 2016

Related U.S. Application Data

(63) Continuation of application No. 13/983,387, filed as application No. PCT/KR2012/005629 on Jul. 13, 2012, now Pat. No. 9,185,612.

(60) Provisional application No. 61/507,597, filed on Jul. 14, 2011.

(51) Int. Cl.
*H04W 8/18* (2009.01)
*H04W 36/00* (2009.01)
*H04W 12/08* (2009.01)

(52) U.S. Cl.
CPC .............. *H04W 8/186* (2013.01); *H04W 12/08* (2013.01); *H04W 36/0066* (2013.01)

(58) Field of Classification Search
CPC .. H04W 8/186; H04W 12/08; H04W 36/0066
See application file for complete search history.

(56) References Cited

U.S. PATENT DOCUMENTS

| 2003/0120765 | A1* | 6/2003 | Radi | H04L 41/22 709/223 |
|---|---|---|---|---|
| 2010/0157943 | A1 | 6/2010 | Horn | |
| 2010/0157944 | A1 | 6/2010 | Horn | 370/331 |
| 2010/0161794 | A1 | 6/2010 | Horn et al. | 709/224 |

(Continued)

FOREIGN PATENT DOCUMENTS

| CN | 101883347 A | 11/2010 |
|---|---|---|
| CN | 101945449 A | 1/2011 |

(Continued)

OTHER PUBLICATIONS

3GPP TS 36.300 V9.7.0(Mar. 2011). Retrieved from the Internet <URL: http://www.quintillion.co.jp/3GPP/Specs/36300-970.pdf>. See p. 14, p. 23, and pp. 48-50.

(Continued)

*Primary Examiner* — Brian D Nguyen
(74) *Attorney, Agent, or Firm* — Dentons US LLP

(57) ABSTRACT

A method and apparatus for performing a membership verification or an access control in a wireless communication system is provided. A mobility management entity (MME) performs the membership verification or the access control of a user equipment (UE), and transmits verified UE membership information to a target HeNB.

20 Claims, 17 Drawing Sheets

(56) References Cited

U.S. PATENT DOCUMENTS

| | | | |
|---|---|---|---|
| 2010/0265827 A1* | 10/2010 | Horn | H04W 72/10 370/241 |
| 2011/0151878 A1 | 6/2011 | Xu et al. | |
| 2011/0269465 A1 | 11/2011 | Xu et al. | 455/436 |
| 2011/0294458 A1* | 12/2011 | Tiwari | H04W 76/064 455/404.1 |
| 2011/0310799 A1* | 12/2011 | Horn | H04W 76/02 370/328 |
| 2012/0071200 A1 | 3/2012 | Bienas et al. | 455/525 |
| 2012/0082090 A1* | 4/2012 | Horn | H04W 76/02 370/328 |
| 2012/0100852 A1 | 4/2012 | Horn | 455/436 |
| 2012/0196594 A1 | 8/2012 | Abhishek et al. | 455/435.1 |
| 2012/0236828 A1 | 9/2012 | Hapsari et al. | |
| 2012/0253925 A1* | 10/2012 | Chen | H04W 84/045 705/14.49 |
| 2012/0263147 A1 | 10/2012 | Takahashi et al. | |

FOREIGN PATENT DOCUMENTS

| | | |
|---|---|---|
| JP | 2013526209 A | 6/2013 |
| JP | 2013530550 A | 7/2013 |
| KR | 1020110120225 A | 11/2011 |
| WO | 2011040601 A1 | 4/2011 |
| WO | 2011068213 A1 | 6/2011 |
| WO | 2011116694 A1 | 9/2011 |
| WO | 2011136534 A2 | 11/2011 |

OTHER PUBLICATIONS

3GPP draft: R3-101924. 3GPP TSG-RAN2 Meeting #69. San Francisco, USA, Feb. 22-26, 2010. See sections 3. 1-4.6.4.

3GPP draft:: R2-113682. 3GPP TSG-RAN WG2 Meeting #74. Barcelona, Spain. May 9-13, 2011. See sections 4.6.2-10.1.2.1.1.

* cited by examiner (a)

(b)

Same CSG ID or traget HeNB with open mode

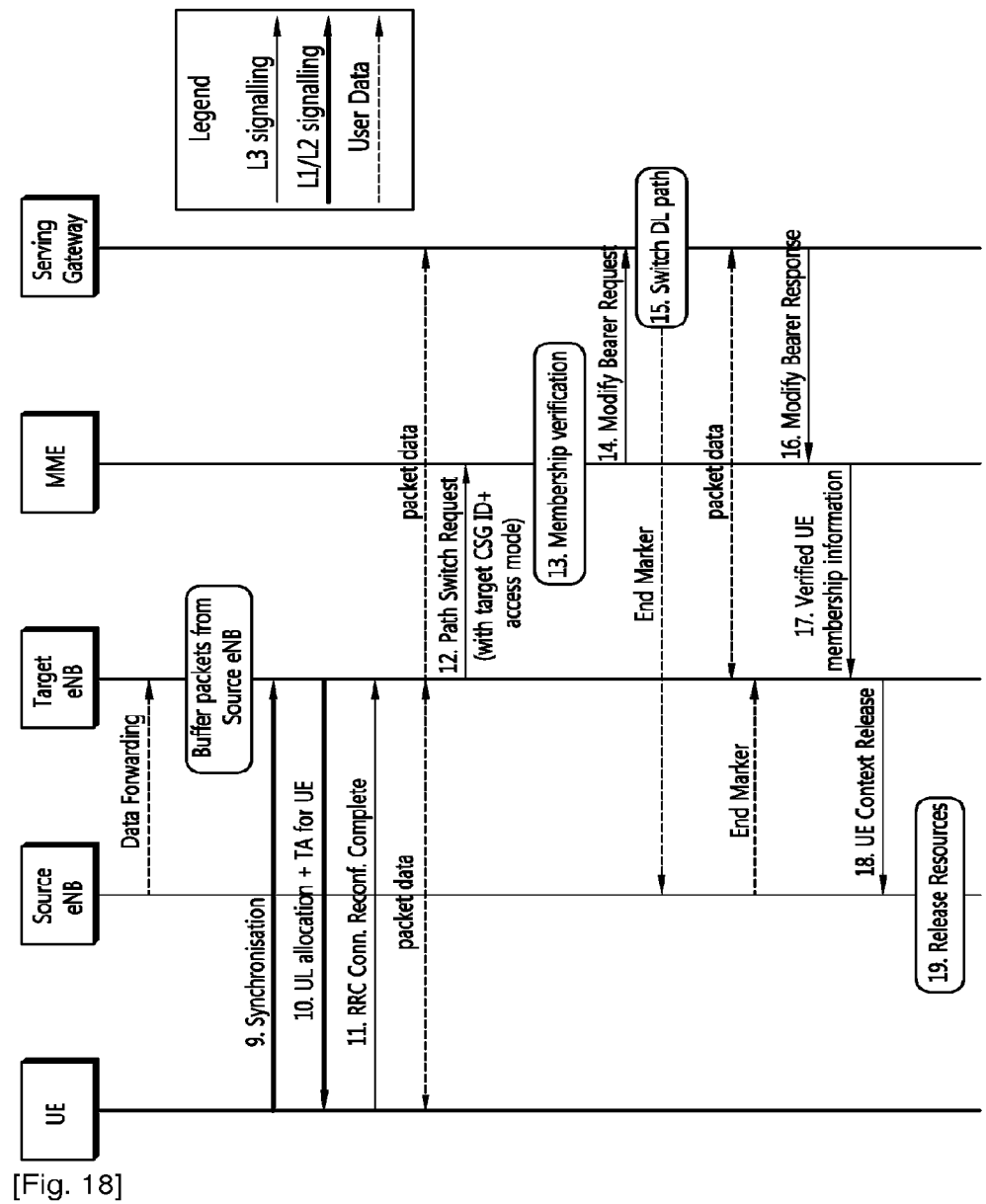
Fig. 17b
[Fig. 18]
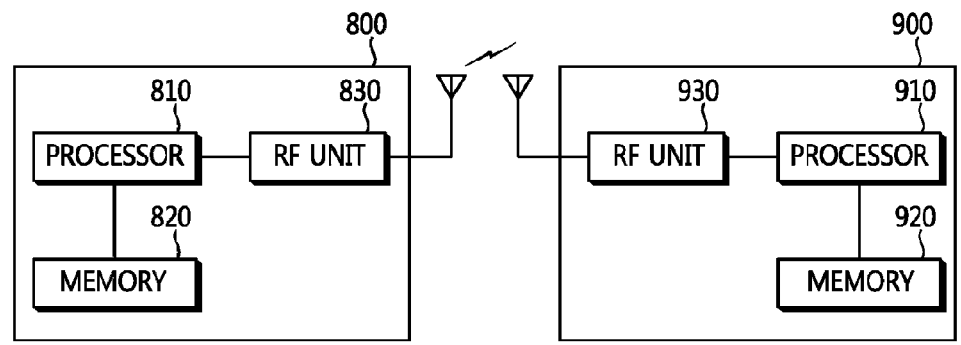

METHOD AND APPARATUS FOR PERFORMING MEMBERSHIP VERIFICATION OR ACCESS CONTROL IN WIRELESS COMMUNICATION SYSTEM

This application is a continuation of application Ser. No. 13/983,387 filed Aug. 2, 2013, now U.S. Pat. No. 9,185,612 which claims benefit of PCT Application No. PCT/KR2012/005629 filed on Jul. 13, 2012 which claims benefit of priority of U.S. Provisional Application No. 61/507,597 filed on Jul. 14, 2011, all of which are incorporated by reference in their entirety herein.

TECHNICAL FIELD

The present invention relates to wireless communication, and more particularly, to a method and apparatus for performing a membership verification or an access control in a wireless communication system.

BACKGROUND ART

Universal mobile telecommunications system (UMTS) is a 3rd generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

FIG. 1 shows network structure of an evolved universal mobile telecommunication system (E-UMTS). The E-UMTS may be also referred to as an LTE system. The communication network is widely deployed to provide a variety of communication services such as voice over internet protocol (VoIP) through IMS and packet data.

As illustrated in FIG. 1, the E-UMTS network includes an evolved UMTS terrestrial radio access network (E-UTRAN), an evolved packet core (EPC) and one or more user equipment. The E-UTRAN may include one or more evolved NodeB (eNB) 20, and a plurality of user equipment (UE) 10. One or more E-UTRAN mobility management entity (MME)/system architecture evolution (SAE) gateways (S-GW) 30 may be positioned at the end of the network and connected to an external network.

As used herein, "downlink" refers to communication from eNB 20 to UE 10, and "uplink" refers to communication from the UE to an eNB. UE 10 refers to communication equipment carried by a user and may be also referred to as a mobile station (MS), a user terminal (UT), a subscriber station (SS) or a wireless device.

An eNB 20 provides end points of a user plane and a control plane to the UE 10. MME/S-GW 30 provides an end point of a session and mobility management function for UE 10. The eNB and MME/S-GW may be connected via an S1 interface.

The eNB 20 is generally a fixed station that communicates with a UE 10, and may also be referred to as a base station (BS) or an access point. One eNB 20 may be deployed per cell. An interface for transmitting user traffic or control traffic may be used between eNBs 20.

The MME provides various functions including non-access stratum (NAS) signaling to eNBs 20, NAS signaling security, access stratum (AS) security control, Inter core network (CN) node signaling for mobility between 3GPP access networks, Idle mode UE reachability (including control and execution of paging retransmission), tracking area list management (for UE in idle and active mode), packet data network (PDN) GW and serving GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g. deep packet inspection), lawful interception, UE internet protocol (IP) address allocation, transport level packet marking in the downlink, UL and DL service level charging, gating and rate enforcement, DL rate enforcement based on APN-AMBR. For clarity MME/S-GW 30 will be referred to herein simply as a "gateway," but it is understood that this entity includes both an MME and an SAE gateway.

A plurality of nodes may be connected between eNB 20 and gateway 30 via the S1 interface. The eNBs 20 may be connected to each other via an X2 interface and neighboring eNBs may have a meshed network structure that has the X2 interface.

FIG. 2 shows architecture of a typical E-UTRAN and a typical EPC.

As illustrated, eNB 20 may perform functions of selection for gateway 30, routing toward the gateway during a radio resource control (RRC) activation, scheduling and transmitting of paging messages, scheduling and transmitting of broadcast channel (BCH) information, dynamic allocation of resources to UEs 10 in both uplink and downlink, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

FIG. 3 shows a user-plane protocol and a control-plane protocol stack for the E-UMTS.

FIG. 3(a) is block diagram depicting the user-plane protocol, and FIG. 3(b) is block diagram depicting the control-plane protocol. As illustrated, the protocol layers may be divided into a first layer (L1), a second layer (L2) and a third layer (L3) based upon the three lower layers of an open system interconnection (OSI) standard model that is well known in the art of communication systems.

The physical layer, the L1, provides an information transmission service to an upper layer by using a physical channel. The physical layer is connected with a medium access control (MAC) layer located at a higher level through a transport channel, and data between the MAC layer and the physical layer is transferred via the transport channel. Between different physical layers, namely, between physical layers of a transmission side and a reception side, data is transferred via the physical channel.

The MAC layer of the L2 provides services to a radio link control (RLC) layer (which is a higher layer) via a logical channel. The RLC layer of the L2 supports the transmission of data with reliability. It should be noted that the RLC layer illustrated in FIGS. 3(a) and 3(b) is depicted because if the RLC functions are implemented in and performed by the MAC layer, the RLC layer itself is not required. A packet data convergence protocol (PDCP) layer of the L2 performs a header compression function that reduces unnecessary control information such that data being transmitted by employing IP packets, such as IPv4 or IPv6, can be efficiently sent over a radio (wireless) interface that has a relatively small bandwidth.

A radio resource control (RRC) layer located at the lowest portion of the L3 is only defined in the control plane and controls logical channels, transport channels and the physical channels in relation to the configuration, reconfiguration, and release of the radio bearers (RBs). Here, the RB signifies a service provided by the L2 for data transmission between the terminal and the UTRAN.

As illustrated in FIG. 3(a), the RLC and MAC layers (terminated in an eNB 20 on the network side) may perform functions such as scheduling, automatic repeat request (ARQ), and hybrid automatic repeat request (HARQ). The PDCP layer (terminated in eNB 20 on the network side) may perform the user plane functions such as header compression, integrity protection, and ciphering.

As illustrated in FIG. 3(b), the RLC and MAC layers (terminated in an eNodeB 20 on the network side) perform the same functions for the control plane. As illustrated, the RRC layer (terminated in an eNB 20 on the network side) may perform functions such as broadcasting, paging, RRC connection management, RB control, mobility functions, and UE measurement reporting and controlling. The NAS control protocol (terminated in the MME of gateway 30 on the network side) may perform functions such as a SAE bearer management, authentication, LTE_IDLE mobility handling, paging origination in LTE_IDLE, and security control for the signaling between the gateway and UE 10.

The RRC state may be divided into two different states such as a RRC_IDLE and a RRC_CONNECTED. In RRC_IDLE state, the UE 10 may receive broadcasts of system information and paging information while the UE specifies a discontinuous reception (DRX) configured by NAS, and the UE has been allocated an identification (ID) which uniquely identifies the UE in a tracking area and may perform PLMN selection and cell re-selection. Also, in RRC_IDLE state, no RRC context is stored in the eNB.

In RRC_CONNECTED state, the UE 10 has an E-UTRAN RRC connection and a context in the E-UTRAN, such that transmitting and/or receiving data to/from the network (eNB) becomes possible. Also, the UE 10 can report channel quality information and feedback information to the eNB.

In RRC_CONNECTED state, the E-UTRAN knows the cell to which the UE 10 belongs. Therefore, the network can transmit and/or receive data to/from UE 10, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE 10 specifies the paging DRX cycle. Specifically, the UE 10 monitors a paging signal at a specific paging occasion of every UE specific paging DRX cycle.

The paging occasion is a time interval during which a paging signal is transmitted. The UE 10 has its own paging occasion.

A paging message is transmitted over all cells belonging to the same tracking area. If the UE 10 moves from one tracking area to another tracking area, the UE will send a tracking area update message to the network to update its location.

FIG. 4 shows an example of structure of a physical channel.

The physical channel transfers signaling and data between layer L1 of a UE and eNB. As illustrated in FIG. 4, the physical channel transfers the signaling and data with a radio resource, which consists of one or more sub-carriers in frequency and one more symbols in time.

One sub-frame, which is 1 ms in length, consists of several symbols. The particular symbol(s) of the sub-frame, such as the first symbol of the sub-frame, can be used for downlink control channel (PDCCH). PDCCHs carry dynamic allocated resources, such as PRBs and modulation and coding scheme (MCS).

A transport channel transfers signaling and data between the L1 and MAC layers. A physical channel is mapped to a transport channel.

Downlink transport channel types include a broadcast channel (BCH), a downlink shared channel (DL-SCH), a paging channel (PCH) and a multicast channel (MCH). The BCH is used for transmitting system information. The DL-SCH supports HARQ, dynamic link adaptation by varying the modulation, coding and transmit power, and both dynamic and semi-static resource allocation. The DL-SCH also may enable broadcast in the entire cell and the use of beamforming. The PCH is used for paging a UE. The MCH is used for multicast or broadcast service transmission.

Uplink transport channel types include an uplink shared channel (UL-SCH) and random access channel(s) (RACH). The UL-SCH supports HARQ and dynamic link adaptation by varying the transmit power and potentially modulation and coding. The UL-SCH also may enable the use of beamforming. The RACH is normally used for initial access to a cell.

The MAC sublayer provides data transfer services on logical channels. A set of logical channel types is defined for different data transfer services offered by MAC. Each logical channel type is defined according to the type of information transferred.

Logical channels are generally classified into two groups. The two groups are control channels for the transfer of control plane information and traffic channels for the transfer of user plane information.

Control channels are used for transfer of control plane information only. The control channels provided by MAC include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by MAC include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include a DCCH that can be mapped to UL-SCH, a DTCH that can be mapped to UL-SCH and a CCCH that can be mapped to UL-SCH. Downlink connections between logical channels and transport channels include a BCCH that can be mapped to BCH or DL-SCH, a PCCH that can be mapped to PCH, a DCCH that can be mapped to DL-SCH, and a DTCH that can be mapped to DL-SCH, a MCCH that can be mapped to MCH, and a MTCH that can be mapped to MCH.

The specification of a home eNB (HeNB) is currently ongoing in 3GPP LTE. It may be referred to Paragraph 4.6.1 of 3GPP (3rd generation partnership project) TS 36.300 V10.2.0 (2010 December). The HeNB is a small base station designed for use in residential or small business environment. The HeNB may be a femto cell or a pico cell. The HeNB is short range about tens of meter, installed by the consumer for better indoor voice and data reception.

FIG. 5 shows logical architecture of an E-UTRAN HeNB.

Referring to FIG. 5, a HeNB 50 may be connected with an EPC 60 through an S1 interface. A HeNB gateway (55, HeNB GW) may be deployed between the HeNB 50 and the EPC 60 to allow the S1 interface and to scale to support a large number of HeNBs. The HeNB GW 55 serves as a concentrator for the C(control)-Plane, specifically the S1-MME interface. The S1-U interface from the HeNB 50 may be terminated at the HeNB GW 55, or a direct logical U(user)-Plane connection between HeNB 50 and S-GW 56 may be used. The S1 interface may be defined as the interface between the HeNB GW 55 and the core network, between the HeNB 50 and the HeNB GW 55, between the HeNB 50 and the core network, and between the eNB and the core network. Also, the HeNB GW 55 appears to the MME as an eNB. The HeNB GW 55 appears to the HeNB as an MME. The S1 interface between the HeNB 50 and the EPC 60 is the same whether the HeNB 50 is connected to the EPC 60 via a HeNB GW 55 or not.

A closed subscriber group (CSG) identifies subscribers of an operator who are permitted to access one or more cells but which have restricted access (CSG cells). A CSG cell broadcasts a CSG indicator set to true and a specific CSG identity. A HeNB may be a CSG cell. The CSG cell operates with an open mode or a closed mode. When the CSG cell operates with an open mode, the HeNB operates as a normal eNB. When the CSG cell operates with a closed mode, the HeNB provides services only to its associated CSG members. That is, the HeNB may perform access control which is a process that checks whether a UE is allowed to access and to be granted services in a CSG cell. A CSG whitelist is a list stored in a UE containing the CSG identities of the CSG cells to which the subscriber belongs.

A hybrid cell is a cell broadcasting a CSG indicator set to false and a specific CSG identity. This cell is accessible as a CSG cell by UEs which are members of the CSG cell and as a normal cell by all other UEs. The hybrid cell may check whether a UE is a member or non-member of the hybrid cell. This process may be referred as a membership verification. The UEs which are members of the CSG cell may have a higher priority than other UEs to access to the hybrid cell. The hybrid cell may be referred as a CSG cell which operates with a hybrid mode.

FIG. 6 shows overall architecture with deployed HeNB GW.

It may be referred to Paragraph 4.6.1 of 3GPP (3rd generation partnership project) TS 36.300 V9.3.0 (2010 March). Referring to FIG. 6, an E-UTRAN may include one or more eNB 60, one or more HeNB 70 and a HeNB GW 79. One or more E-UTRAN MME/S-GW 69 may be positioned at the end of the network and connected to an external network. The one or more eNB 60 may be connected to each other through the X2 interface. The one or more eNB 60 may be connected to the MME/S-GW 69 through the S1 interface. The HeNB GW 79 may be connected to the MME/S-GW 69 through the S1 interface. The one or more HeNB 70 may be connected to the HeNB GW 79 through the S1 interface or may be connected to the MME/S-GW 69 through the S1 interface. The one or more HeNB 70 may not be connected to each other.

Based on the structure in FIG. 6, if a user equipment (UE) served currently by an HeNB or an eNB requests handover to another HeNB, the path will go through the core network. That is, the handover should be performed through the S1 interface. This handover procedure can be big signaling impact on the core network, which has to deal with a lot of processing. In addition, a handover delay can occur as the handover is performed through the core network, which may be sensitive to UE in a certain situation.

FIG. 7 shows another overall architecture with deployed HeNB GW.

It may be referred to Paragraph 4.6.1 of 3GPP (3rd generation partnership project) TS 36.300 V10.2.0 (2010 December). Referring to FIG. 7, the HeNBs 90 may be connected to each other through the X2 interface. The HeNBs 90 connected to each other through the X2 interface should have same CSG identifiers (IDs) or the target HeNB should operate with the open mode.

FIG. 8 shows a direct connection between HeNBs without deployed HeNB GW.

Referring to FIG. 8, the one or more HeNB 90 may be connected to the MME/S-GW 89 through the S1 interface. The HeNBs 90 may be connected to each other through the X2 interface directly. The HeNBs 90 connected to each other through the X2 interface should have same CSG identifiers (IDs) or the target HeNB should operate with the open mode.

That is, only the HeNBs with the same CSG IDs or the target HeNB which operate with the open mode can have the direct X2 interface even if some HeNB may support the hybrid mode, which can be accessed by any UEs. If the conditions are satisfied, a handover may be performed through the direct X2 interface between HeNBs.

However, the signaling impact problem on the core network and the handover delay problem may still exist due to the implementation limitations. If the CSG IDs are different for the source HeNB and the target HeNB or in case of a handover from the macro eNB to the HeNB, a handover through the S1 interface has to be used. The handover through the S1 interface also has to be used when the target HeNB operates with the hybrid mode even though a UE is not a member of the target HeNB.

In order to solve the problem described above, existing X2 handover procedure can be a solution. However, it is required that how to perform a membership verification of a UE for efficient X2 handover procedure when the target HeNB is a hybrid cell. In addition, it is required that how to perform an access control when the target HeNB operates with the closes mode.

SUMMARY OF INVENTION

Technical Problem

The present invention provides a method and apparatus for performing a membership verification or an access control in a wireless communication system. The present invention provides a method of performing a membership verification or an access control for HeNB mobility enhancement when the target HeNB is a hybrid cell or the target HeNB operates with a closed mode.

Technical Solution

In an aspect, a method for performing, by a mobility management entity (MME), a membership verification in a wireless communication system is provided. The method includes receiving a path switch request message including a closed group subscription (CSG) identifier (ID) of a target home eNodeB (HeNB) and an access mode of the target HeNB from the target HeNB, the target HeNB operating with a hybrid mode, performing the membership verification of a user equipment (UE) according to the CSG ID of the target HeNB, the access mode of the target HeNB and stored UE subscription information, and transmitting verified UE membership information to the target HeNB.

The verified UE membership information may indicate that the UE is a member of the target HeNB.

The verified UE membership information may indicate that the UE is not a member of the target HeNB.

The UE may be regarded as a member of the target HeNB before the membership verification is performed.

The UE may be not regarded as a member of the target HeNB before the membership verification is performed.

The verified UE membership information may be included in a path switch response message which is a response of the path switch request message.

The verified UE membership information may be included in the existing message or a new message.

In another aspect, a method for performing, by a target home eNodeB (HeNB) which operates with a hybrid mode, a handover procedure in a wireless communication system is provided. The method includes receiving a handover request message from a source eNB, deciding whether the handover procedure is acknowledge or not, if the handover procedure is acknowledged, transmitting a path switch request message including a closed group subscription (CSG) identifier (ID) of the target HeNB and an access mode of the target HeNB to a mobility management entity (MME), and receiving verified user equipment (UE) membership information from the MME.

The source eNB may be a macro eNB or a HeNB.

The handover request message may be received through a direct X2 interface or an indirect X2 interface.

If the handover procedure is acknowledged, the method may further include pre-deciding a UE as a member of the target HeNB before transmitting the path switch request message to the MME.

If the verified UE membership information indicates that the UE is not a member of the target HeNB, the method may further include down-prioritizing the UE as a non-member of the target HeNB or excluding the UE from the target HeNB.

If the handover procedure is acknowledged, the method further include pre-deciding a UE as a non-member of the target HeNB before transmitting the path switch request message to the MME.

If the verified UE membership information indicates that the UE is a member of the target HeNB, the method may further include adjusting the priority of the UE and preparing resources for the UE.

The verified UE membership information may be included in a path switch response message which is a response of the path switch request message.

The verified UE membership information may be included in the existing message or a new message.

In another aspect, a method for performing, by a mobility management entity (MME), an access control in a wireless communication system is provided. The method includes receiving a path switch request message including a closed group subscription (CSG) identifier (ID) of a target home eNodeB (HeNB) from the target HeNB, the target HeNB operating with a closed mode, performing the access control of a user equipment (UE) according to the CSG ID of the target HeNB and stored UE subscription information, and transmitting verified UE membership information to the target HeNB.

The verified UE membership information may indicate that the UE is a member of the target HeNB.

The verified UE membership information may indicate that the UE is not a member of the target HeNB.

Advantageous Effects

The membership verification or the access control can be performed efficiently.

DESCRIPTION OF DRAWINGS

FIGS. 17a and 17b show an example of an intra-MME/S-GW handover procedure according to an embodiment of the present invention.

FIG. 18 is a block diagram showing wireless communication system to implement an embodiment of the present invention.

MODE FOR INVENTION

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

In 3GPP LTE-A rel11-11 or beyond, the following architectures may be considered to be deployed.

Figure 9:
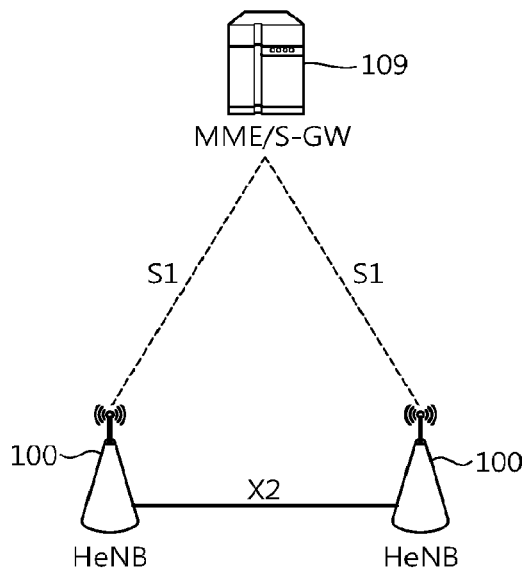
FIG. 9 shows a direct connection between HeNBs without deployed HeNB GW.

FIG. 9 shows a direct connection between HeNBs without deployed HeNB GW.

Figure 1:
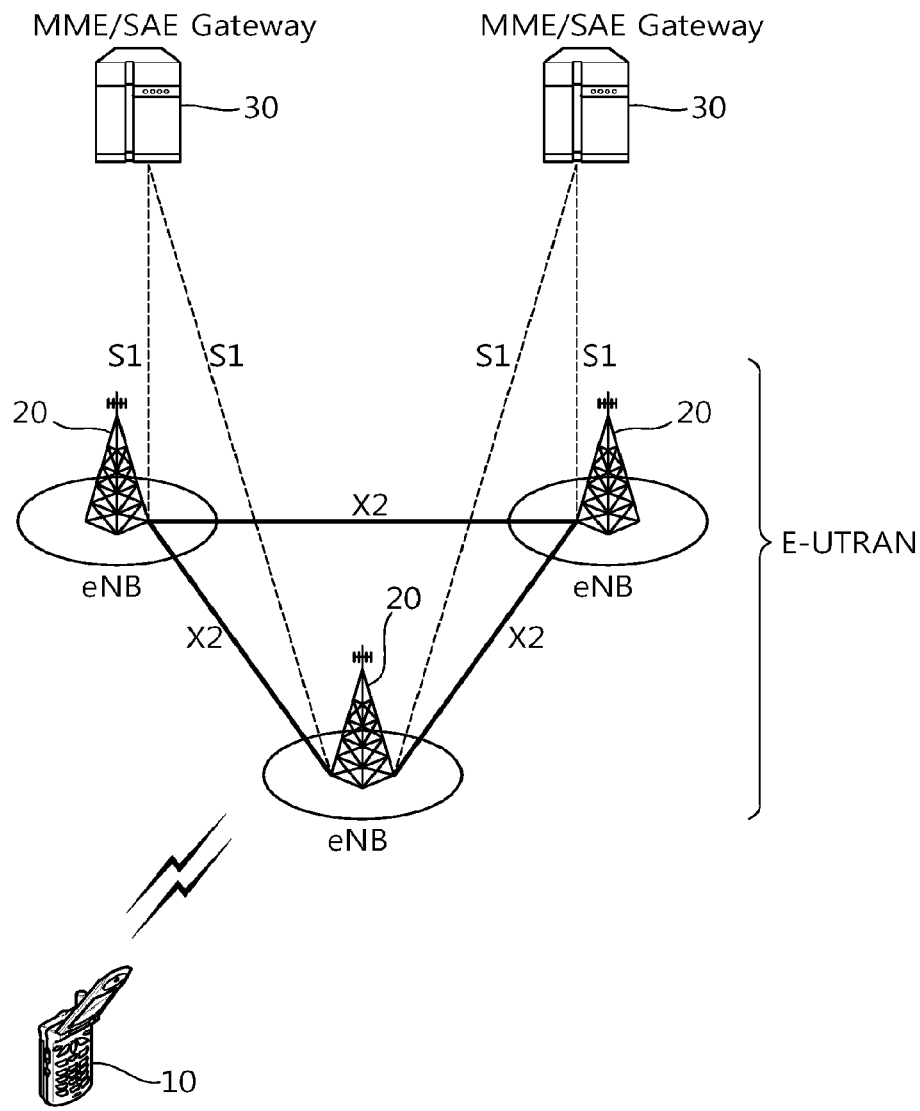
FIG. 1 shows network structure of an evolved universal mobile telecommunication system (E-UMTS).
Figure 2:
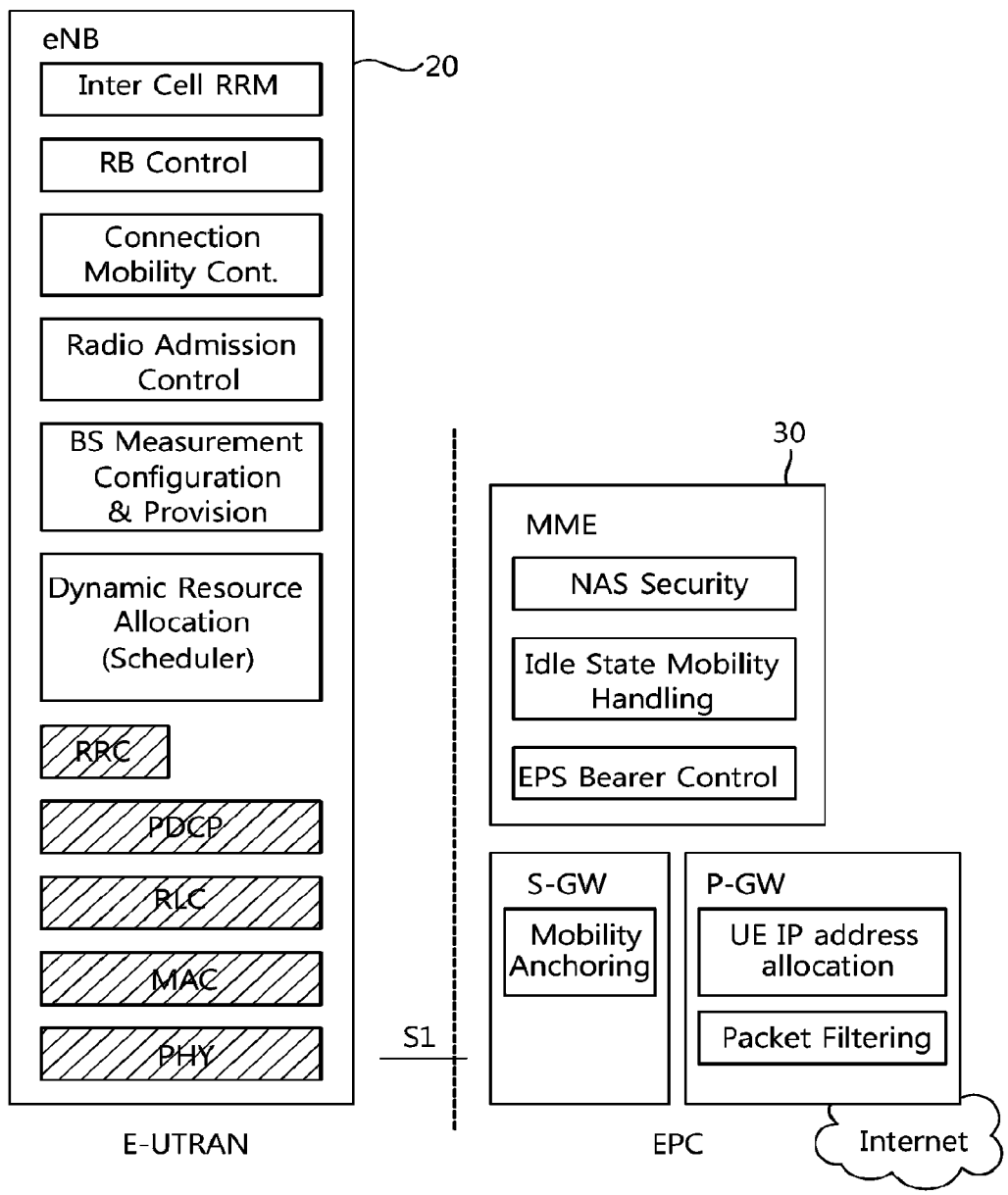
FIG. 2 shows architecture of a typical E-UTRAN and a typical EPC.
Figure 3:
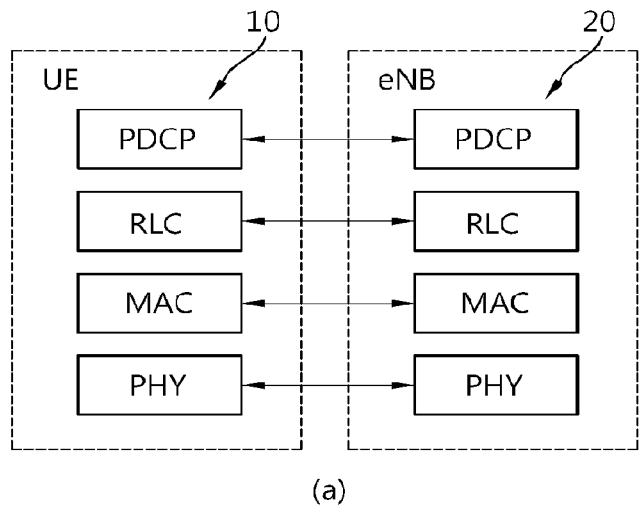
FIG. 3 shows a user-plane protocol and a control-plane protocol stack for the E-UMTS.
Figure 3:
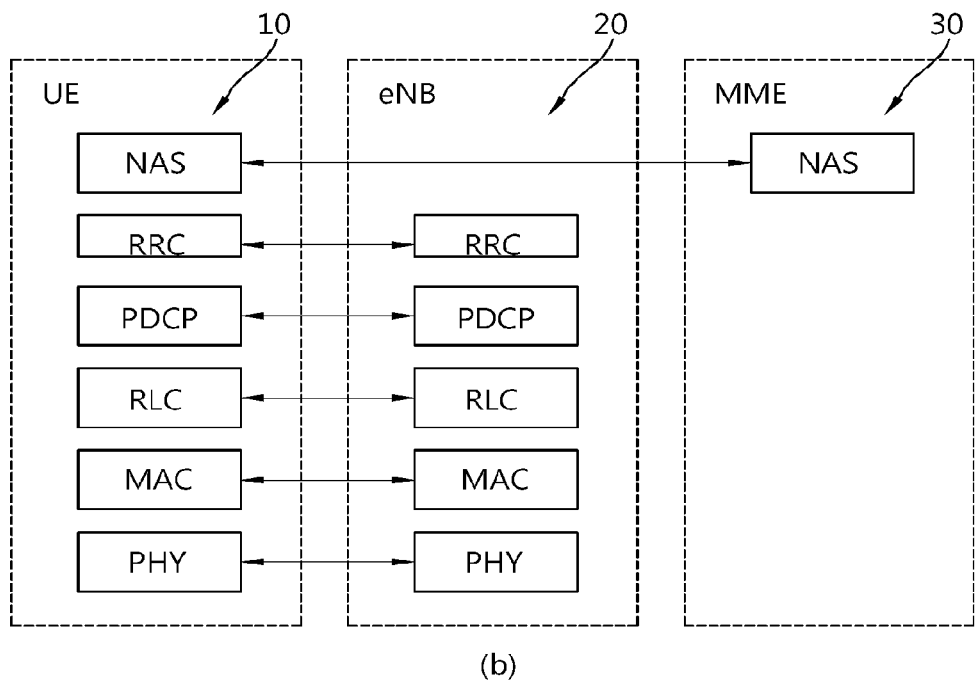
Figure 4:
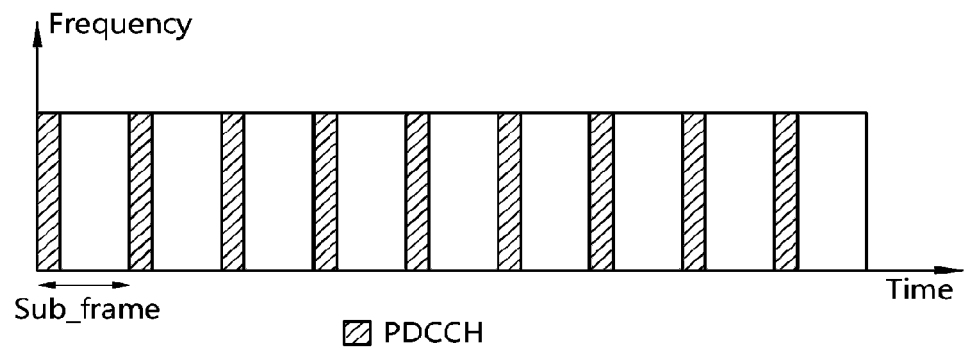
FIG. 4 shows an example of structure of a physical channel.
Figure 5:
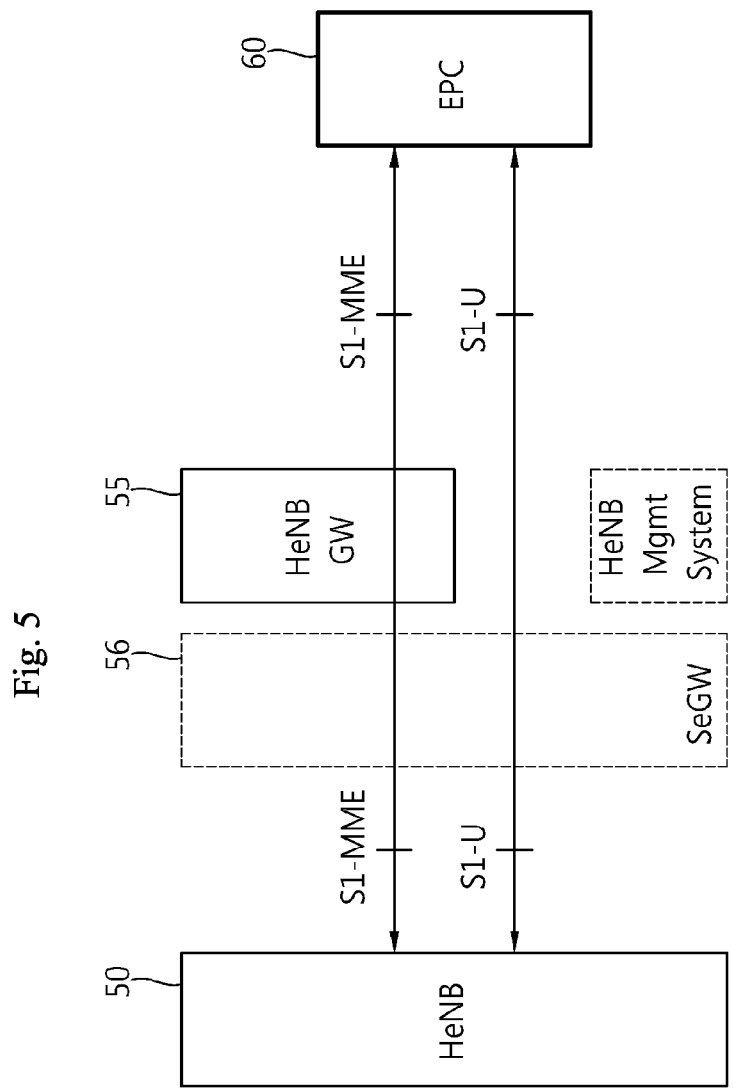
FIG. 5 shows logical architecture of an E-UTRAN HeNB.
Figure 6:
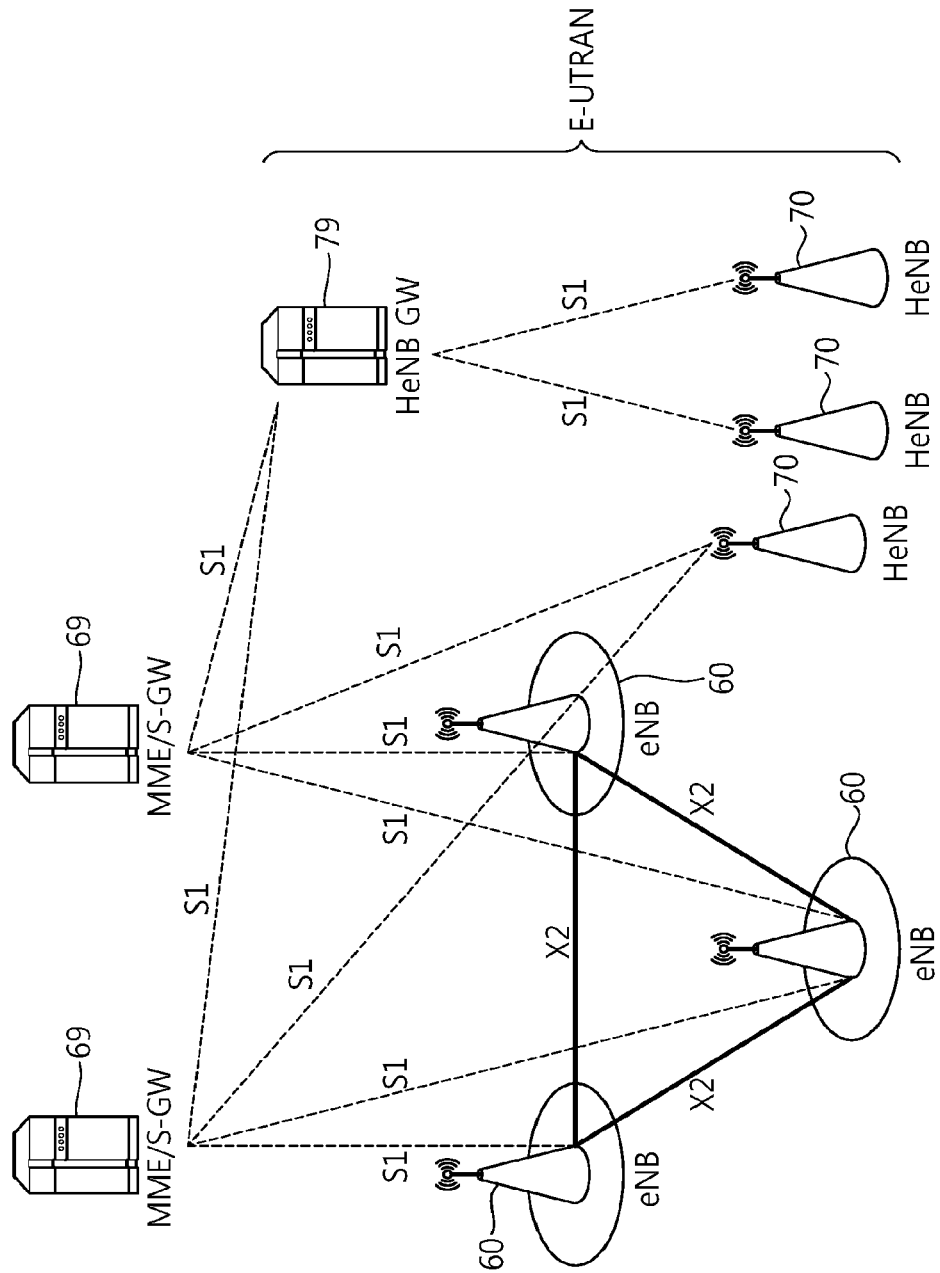
FIG. 6 shows overall architecture with deployed HeNB GW.
Figure 7:
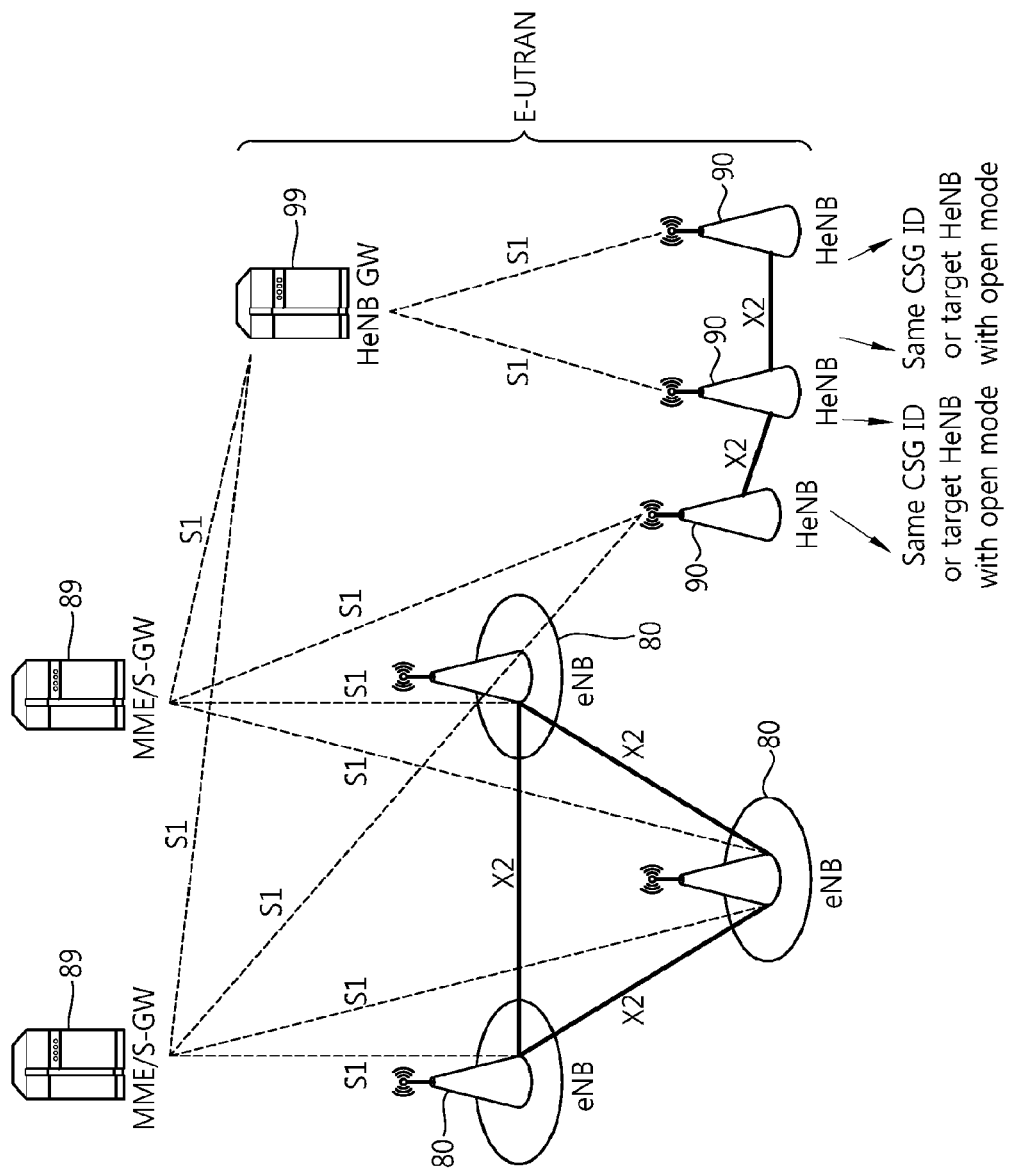
FIG. 7 shows another overall architecture with deployed HeNB GW.
Figure 8:
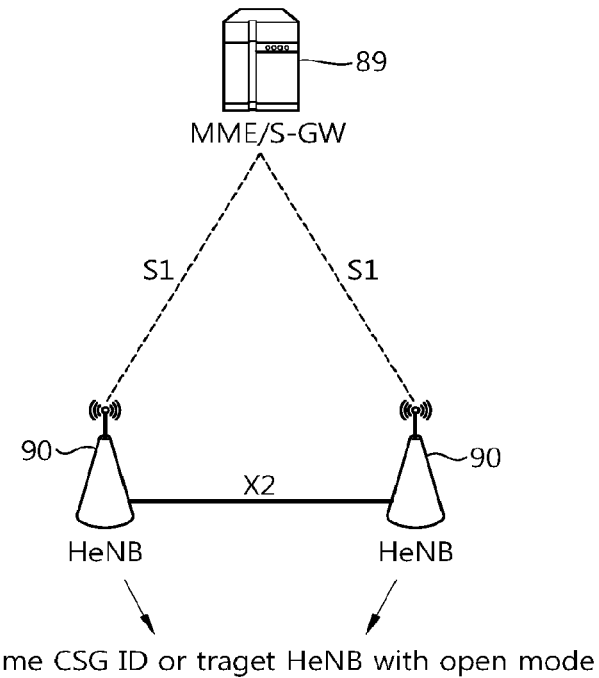
FIG. 8 shows a direct connection between HeNBs without deployed HeNB GW.

Referring to FIG. 9, the one or more HeNB 100 may be connected to the MME/S-GW 109 through the S1 interface. The HeNBs 100 may be connected to each other through the X2 interface directly. Unlike FIG. 8, The HeNBs 100 connected to each other through the X2 interface need not to have same CSG identifiers (IDs) or the target HeNB need not to operate with the open mode.

Figure 10:
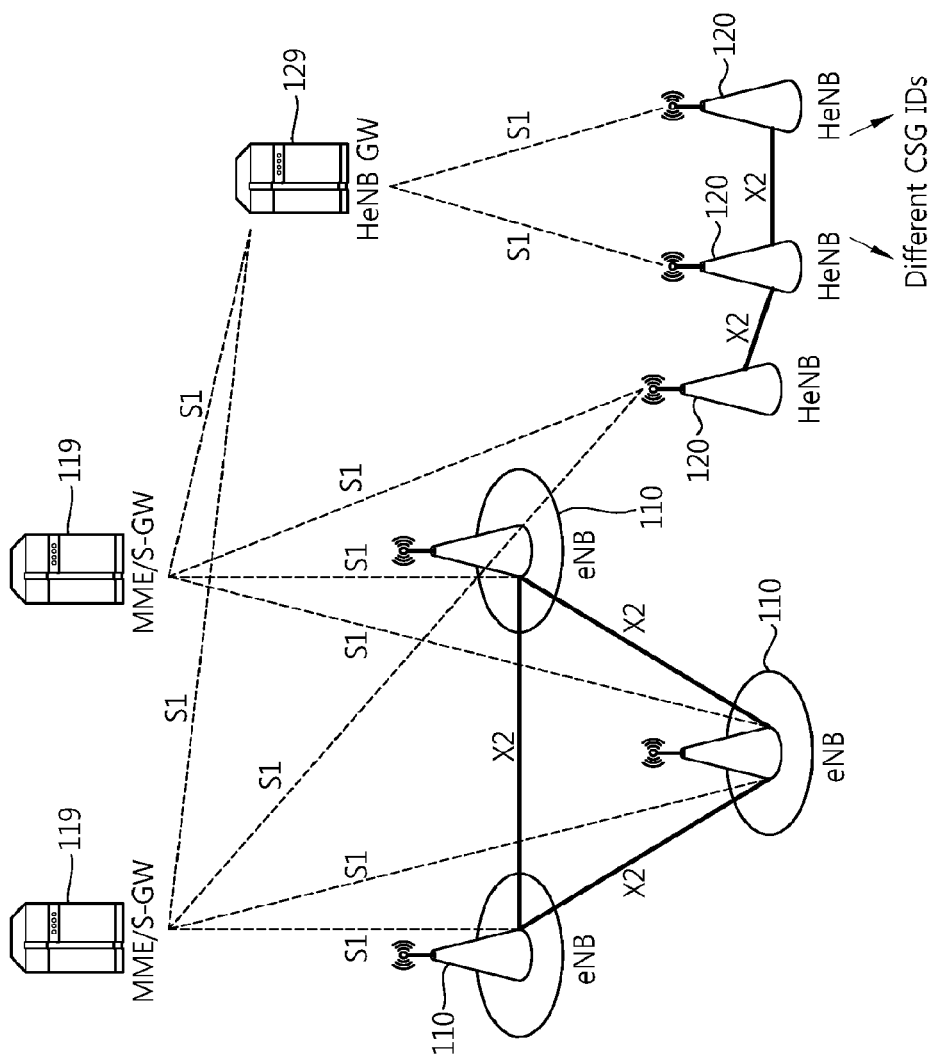
FIG. 10 shows overall architecture with deployed HeNB GW.

FIG. 10 shows overall architecture with deployed HeNB GW.

Referring to FIG. 10, an E-UTRAN may include one or more eNB 110, one or more HeNB 120 and a HeNB GW 129. One or more E-UTRAN MME/S-GW 119 may be positioned at the end of the network and connected to an external network. The one or more eNB 110 may be connected to each other through the X2 interface. The one or more eNB 110 may be connected to the MME/S-GW 119 through the S1 interface. The HeNB GW 129 may be connected to the MME/S-GW 119 through the S1 interface. The one or more HeNB 120 may be connected to the HeNB GW 129 through the S1 interface or may be connected to the MME/S-GW 119 through the S1 interface. The HeNBs 120 may be connected to each other through the direct X2 interface. The HeNBs 120 may have same CSG IDs. Or, the HeNBs 120 may have different CSG IDs.

Figure 11:
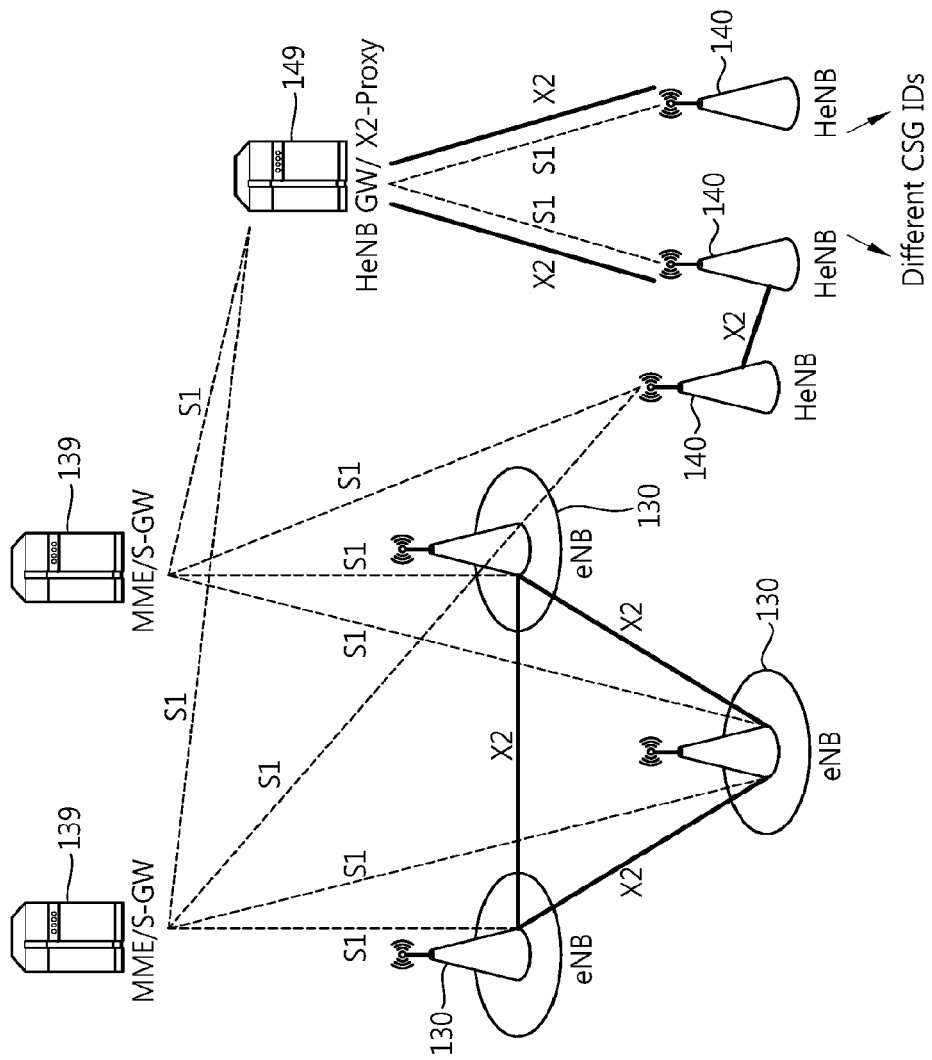
FIG. 11 shows another overall architecture with deployed HeNB GW/X2-proxy.

FIG. 11 shows another overall architecture with deployed HeNB GW/X2-proxy.

The overall architecture with deployed HeNB GW/X2-proxy of FIG. 11 is the same as that of FIG. 10. But, in FIG. 11, the HeNBs 140 may be connected to each other through the indirect X2 interface. The HeNBs 140 may have same CSG IDs. Or, the HeNBs 140 may have different CSG IDs. The indirect X2 interface between the HeNBs 140 goes through the HeNB GW/X2-proxy 149. The HeNB GW/X2-proxy 149 may be a HeNB GW having an X2-proxy functionality for supporting the X2 interface. Hereinafter, if the indirect X2 interface goes through the HeNB GW, the HeNB GW may be referred as the HeNB GW/X2-proxy.

Figure 12:
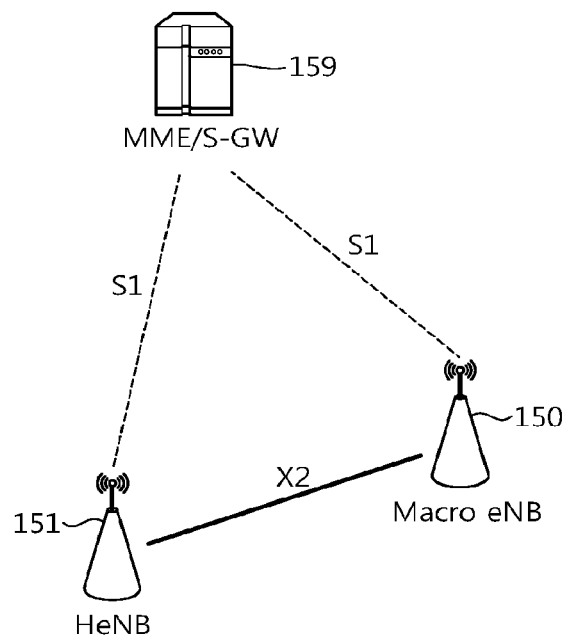
FIG. 12 shows another direct connection between a macro eNB and a HeNB without deployed HeNB GW.

FIG. 12 shows another direct connection between a macro eNB and a HeNB without deployed HeNB GW.

Referring to FIG. 12, the macro eNB 150 and the HeNB 151 may be connected to the MME/S-GW 159 through the S1 interface. The macro eNB 150 and the HeNB 151 may be connected to each other through the X2 interface directly.

Figure 13:
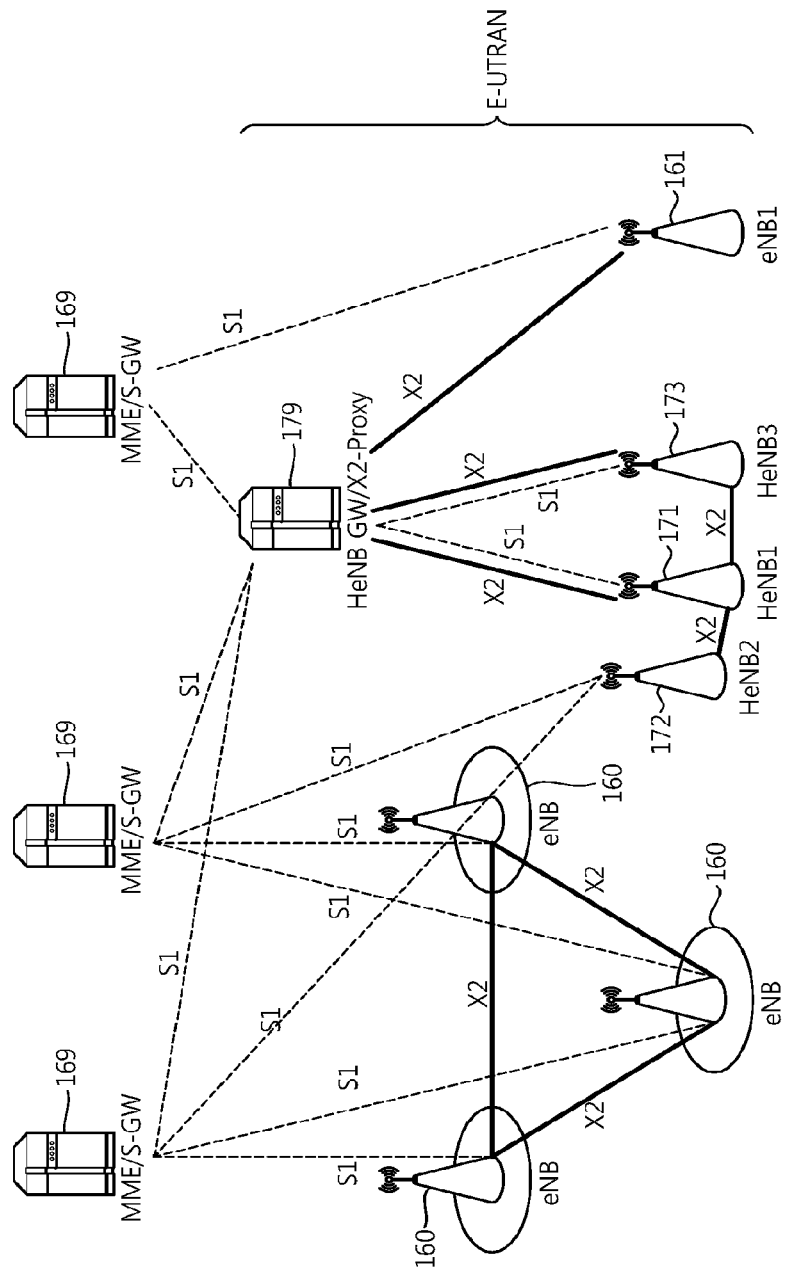
FIG. 13 shows another overall architecture with deployed HeNB GW/X2-proxy.

FIG. 13 shows another overall architecture with deployed HeNB GW/X2-proxy.

Referring to FIG. 13, an E-UTRAN may include one or more eNB 160, macro eNB1 161, HeNB1 171, HeNB2 172, HeNB3 173 and a HeNB GW/X2-proxy 179. One or more E-UTRAN MME/S-GW 169 may be positioned at the end of the network and connected to an external network. The eNBs 160 may be connected to each other through the X2 interface. The eNBs 160 may be connected to the MME/S-GW 169 through the S1 interface. The HeNB GW/X2-proxy 179 may be connected to the MME/S-GW 169 through the S1 interface. The HeNB1 171 and the HeNB3 173 may be connected to the HeNB GW/X2-proxy 179 through the S1 interface. The HeNB2 172 may be connected to the MME/S-GW 169 through the S1 interface. The HeNBs 171, 172, 173 may be connected to each other through the direct X2 interface. The HeNBs 171, 172, 173 may have same CSG IDs. Or, the HeNBs 171, 172, 173 may have different CSG IDs. The macro eNB1 161 may be connected to the MME/S-GW 169 through the S1 interface. The macro eNB1 161 may be connected to the HeNBs 171, 173 through the indirect X2 interface. The indirect X2 interface between the macro eNB1 161 and the HeNBs 171, 173 goes through the HeNB GW/X2-proxy 179.

Figure 14:
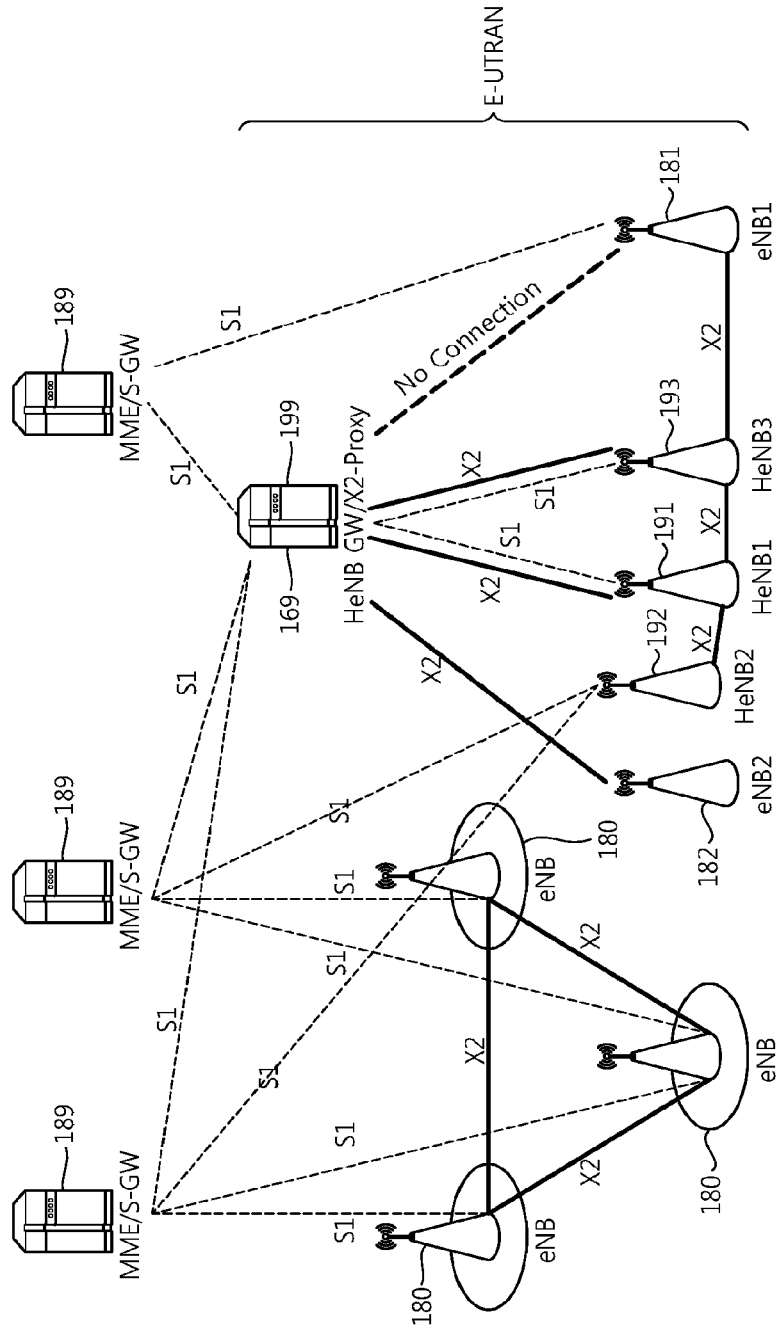
FIG. 14 shows another overall architecture with deployed HeNB GW/X2-proxy.

FIG. 14 shows another overall architecture with deployed HeNB GW/X2-proxy.

Referring to FIG. 14, an E-UTRAN may include one or more eNB 180, macro eNB1 181, macro eNB2 182, HeNB1 191, HeNB2 192, HeNB3 193 and a HeNB GW/X2-proxy 199. One or more E-UTRAN MME/S-GW 189 may be positioned at the end of the network and connected to an external network. The eNBs 180 may be connected to each other through the X2 interface. The eNBs 180 may be connected to the MME/S-GW 189 through the S1 interface. The HeNB GW/X2-proxy 199 may be connected to the MME/S-GW 189 through the S1 interface. The HeNB1 191 and the HeNB3 193 may be connected to the HeNB GW/X2-proxy 199 through the S1 interface. The HeNB2 192 may be connected to the MME/S-GW 189 through the S1 interface. The HeNBs 191, 192, 193 may be connected to each other through the direct X2 interface. The HeNBs 191, 192, 193 may have same CSG IDs. Or, the HeNBs 191, 192, 193 may have different CSG IDs. The macro eNB1 181 may be connected to the MME/S-GW 189 through the S1 interface. The macro eNB1 181 may be connected to the HeNB3 193 through the direct X2 interface. There is no connection between the macro eNB1 181 and the HeNB GW/X2-proxy 199. The macro eNB2 182 may be connected to the HeNB GW/X2-proxy 199 through the X2 interface.

Figure 15A:
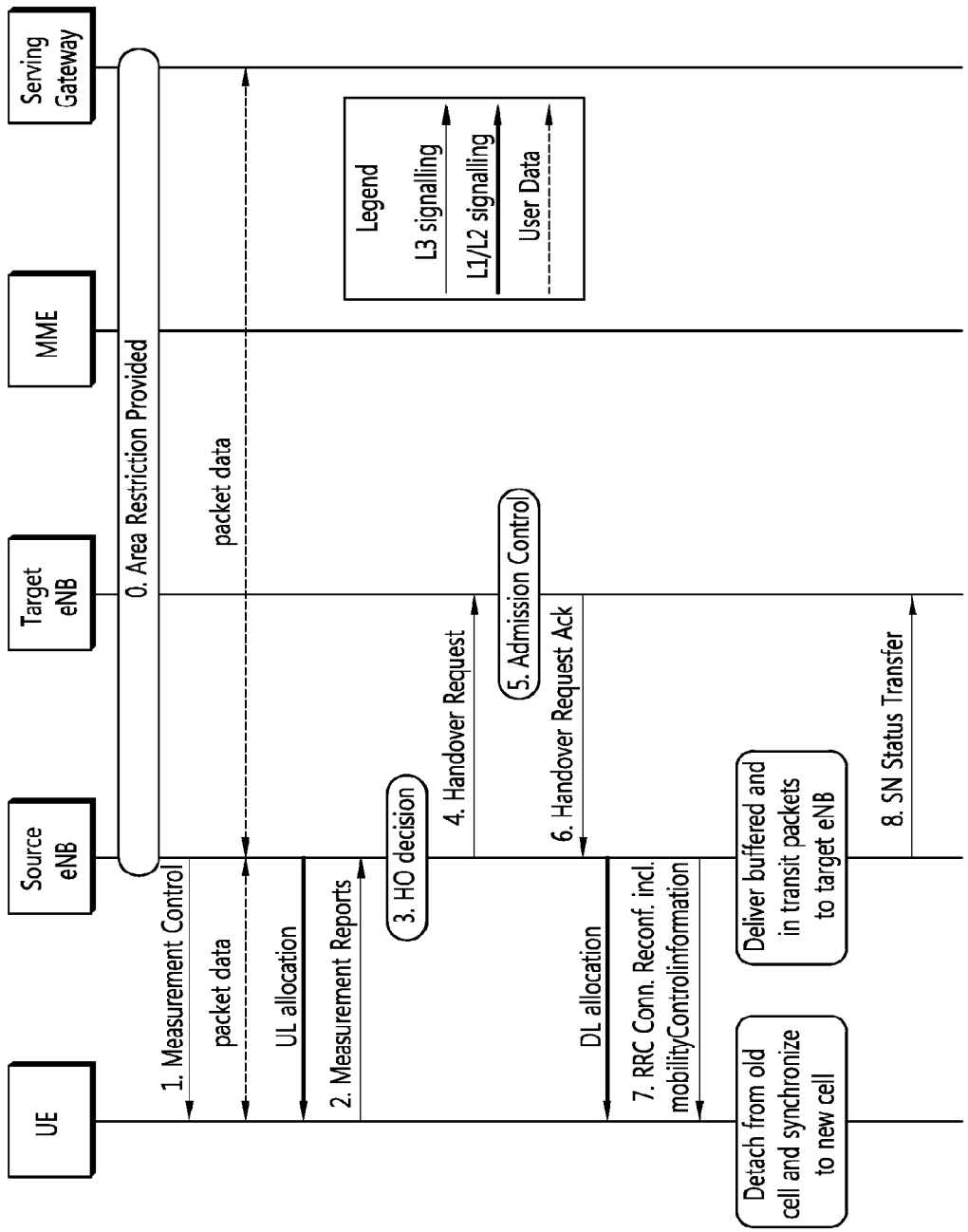
FIGS. 15a and 15b show an example of an intra-MME/S-GW handover procedure.
Figure 15B:
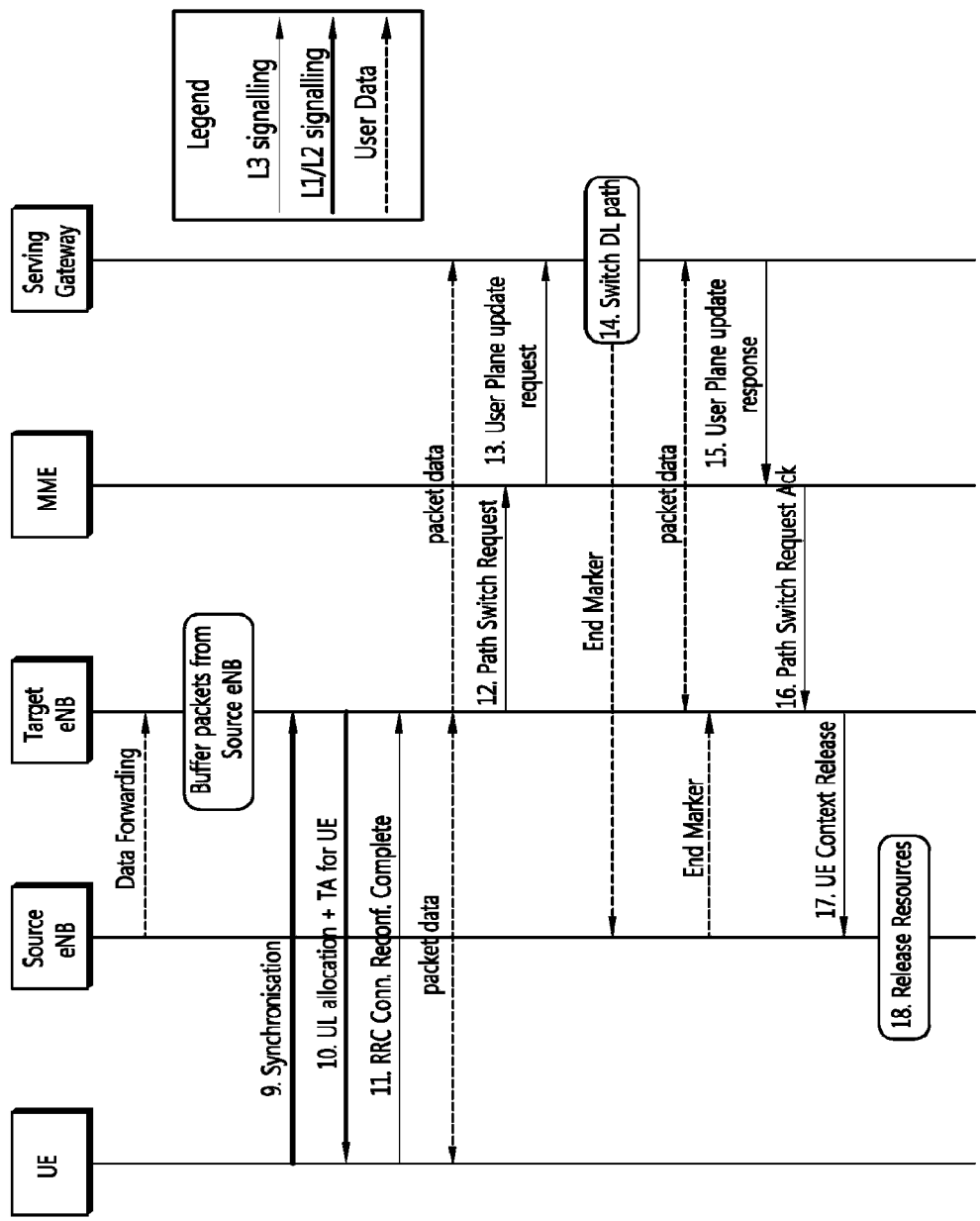

FIGS. 15a and 15b show an example of an intra-MME/S-GW handover procedure.

In E-UTRAN, network-controlled UE-assisted handovers may be performed in RRC_CONNECTED state. Part of the handover command comes from the target eNB and is transparently forwarded to the UE by the source eNB. To prepare the handover procedure, the source eNB passes all necessary information to the target eNB (e.g. E-RAB attributes and RRC context). When a carrier aggregation (CA) is configured and to enable secondary cell (SCell) selection in the target eNB, the source eNB can provide in decreasing order of radio quality a list of the best cells. Both the source eNB and the UE keep some context (e.g. C-RNTI) to enable the return of the UE in case of handover procedure failure. The UE accesses the target cell via a random access channel (RACH) following a contention-free procedure using a dedicated RACH preamble or following a contention-based procedure if dedicated RACH preambles are not available. If the RACH procedure towards the target cell is not successful within a certain time, the UE initiates radio link failure recovery using the best cell.

The preparation and execution phase of the handover procedure is performed without evolved packet core (EPC) involvement. It means that preparation messages are directly exchanged between the eNBs. The release of the resources at the source side during the handover completion phase is triggered by the eNB.

First, the handover preparation procedure is described.

0. Area restriction information is provided. The UE context within the source eNB contains information regarding roaming restrictions which where provided either at connection establishment or at the last timing advance (TA) update.

1. The source eNB configures the UE measurement procedures according to the area restriction information, and transmits a measurement control message to the UE through L3 signaling. Measurements provided by the source eNB may assist the function controlling the UE's connection mobility. Meanwhile, the packet data is exchanged between the UE and the source eNB, or between the source eNB and the serving gateway.

2. The UE transmits measurement reports by the rules set by i.e. system information, specification etc to the source eNB through L3 signaling.

3. The source eNB makes handover decision based on the measurement reports and radio resource management (RRM) information.

4. The source eNB transmits a handover request message through L3 signaling to the target eNB passing necessary information to prepare the handover procedure at the target side. UE X2/UE S1 signaling references enable the target eNB to address the source eNB and the EPC. The evolved radio access bearer (E-RAB) context includes necessary radio network layer (RNL) and transport network layer (TNL) addressing information, and quality of service (QoS) profiles of the E-RABs.

In the case of a UE under an RN performing handover procedure, the handover request message is received by the DeNB, which reads the target cell ID from the message, finds the target eNB corresponding to the target cell ID, and forwards the X2 message toward the target eNB.

In the case of a UE performing handover procedure toward an RN, the handover request is received by the DeNB, which reads the target cell ID from the message, finds the target RN corresponding to the target cell ID, and forwards the X2 message toward the target RN.

5. The target eNB performs admission control. The admission control may be performed dependent on the received E-RAB QoS information to increase the likelihood of a successful handover, if the resources can be granted by target eNB. The target eNB configures the required resources according to the received E-RAB QoS information and reserves a C-RNTI and optionally a RACH preamble. The AS-configuration to be used in the target cell can either be specified independently (i.e. an "establishment") or as a delta compared to the AS-configuration used in the source cell (i.e. a "reconfiguration").

6. The target eNB transmits a handover request acknowledge message to the source eNB through L3 signaling, and prepares the handover. The handover request acknowledge message may include a transparent container to be sent to the UE as an RRC message to perform the handover. The transparent container may include a new C-RNTI, target eNB security algorithm identifiers for the selected security algorithms, a dedicated RACH preamble, and possibly some other parameters i.e. access parameters, SIBs, etc. The handover request acknowledge message may also include RNL/TNL information for the forwarding tunnels, if necessary. Meanwhile, as soon as the source eNB receives the handover request acknowledge message, or as soon as the transmission of the handover command is initiated in the downlink, data forwarding may be initiated.

7. The target eNB transmits an RRC connection reconfiguration message including mobility control information to perform the handover, to be sent by the source eNB to the UE. The source eNB performs the necessary integrity protection and ciphering of the message. The UE receives the RRC connection reconfiguration message with necessary parameters. The UE is commanded by the source eNB to perform the handover procedure. The UE does not need to delay the handover execution for delivering the hybrid automatic repeat request (HARQ)/automatic repeat request (ARQ) responses to the source eNB.

Hereafter, the handover execution procedure will be described.

The UE detaches from old cell and synchronizes to new cell. In addition, the source eNB delivers buffered and in-transit packets to the target eNB.

8. The source eNB transmits a serial number (SN) status transfer message to the target eNB to convey the uplink packet data convergence protocol (PDCP) SN receiver status and the downlink PDCP SN transmitter status of E-RABs for which PDCP status preservation applies. The uplink PDCP SN receiver status may include at least the PDCP SN of the first missing UL SDU and a bit map of the receive status of the out of sequence UL SDUs that the UE needs to retransmit in the target cell, if there are any such SDUs. The downlink PDCP SN transmitter status indicates the next PDCP SN that the target eNB shall assign to new SDUs, not having a PDCP SN yet. The source eNB may omit sending this message if none of the E-RABs of the UE shall be treated with PDCP status preservation.

9. After receiving the RRC connection reconfiguration message including the mobility control information, the UE performs synchronization to the target eNB and access the target cell via RACH. The access to the target cell via the RACH may be a contention-free procedure if a dedicated RACH preamble was indicated in the mobility control information. Or, the access to the target cell via RACH may be a contention-based procedure if no dedicated preamble was indicated. The UE derives target eNB specific keys and configures the selected security algorithms to be used in the target cell.

10. The target eNB responds to the synchronization of the UE with UL allocation and timing advance.

11. When the UE has successfully accessed the target cell, the UE transmits an RRC connection reconfiguration complete message (C-RNTI) to confirm the handover procedure, along with an uplink buffer status report, whenever possible, to the target eNB to indicate that the handover procedure is completed for the UE. The target eNB verifies the C-RNTI sent in the RRC connection reconfiguration complete message. The target eNB can now begin transmitting data to the UE. The packet data is exchanged between the UE and the target eNB.

Hereafter, the handover completion procedure will be described.

12. The target eNB transmits a path switch request message to MME to inform that the UE has changed cell.

13. The MME transmits a user plane update request message to a serving gateway (S-GW).

14. The S-GW switches the downlink data path to the target side. The S-GW transmits one or more end marker packets on the old path to the source eNB and then can release any U-plane/TNL resources towards the source eNB.

15. The S-GW transmits a user plane update response message to MME.

16. The MME transmits a path switch acknowledge message to the target eNB to confirm the path switch request message.

17. The target eNB transmits a UE context release message to the source eNB to inform success of the handover procedure and trigger the release of resources by the source eNB.

18. When the UE context release message is received, the source eNB can release radio and C-plane related resources associated to the UE context. Any ongoing data forwarding may continue.

In the legacy S1 handover procedure, an access control or a membership verification may be performed by a MME. By the access control or the membership verification, prioritization of allocated resources may be performed based on the UE's membership status.

The access control may be performed when the target (H)eNB operates with the closed mode. The membership verification may be performed when the target cell is a hybrid cell. The access control or the membership verification is done by a two step process, where first the UE reports the membership status based on the CSG ID received from the target cell and the UE's CSG whitelist, and then the MME verifies the reported status.

However, in the case of X2 handover procedure, if the access control or the membership verification is still performed by the MME before the X2 handover procedure is acknowledged, some problems may be occurred. Firstly the original objective of reducing the signaling overhead of network and reducing the handover delay cannot be realized since the access control or the membership verification is performed by the MME. Secondly, the access control or the membership verification cannot be realized by the X2 interface technically since there is not any message transmitted to the MME before the handover procedure is acknowledged.

Accordingly, to solve the problem described above, a method of performing a membership verification or an access control according to the present invention can be proposed. At first, the case that the target cell is a hybrid cell is described.

Figure 16:
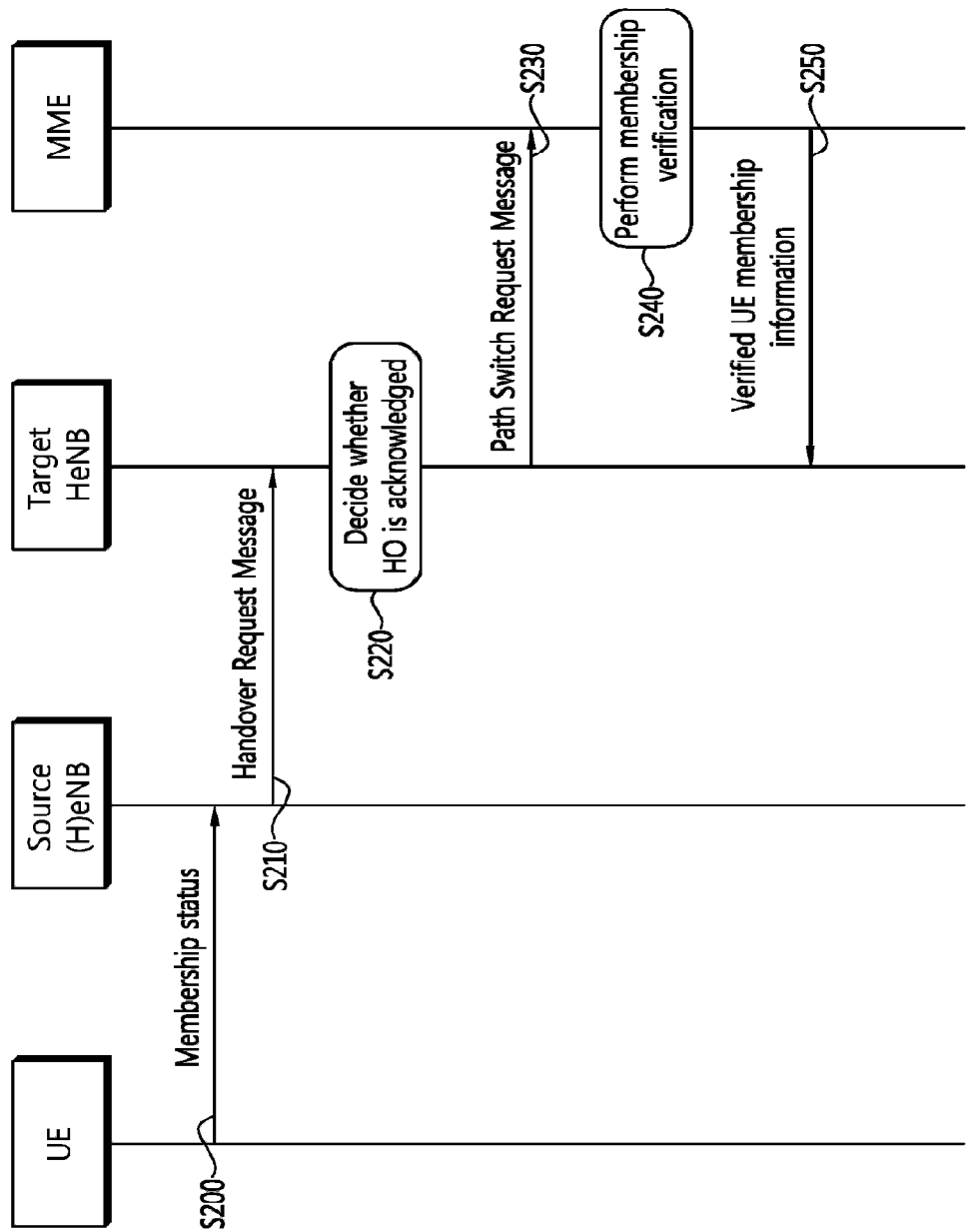
FIG. 16 shows an example of the proposed method of performing a membership verification according to an embodiment of the present invention.

FIG. 16 shows an example of the proposed method of performing a membership verification according to an embodiment of the present invention.

In step S200, the UE transmits a membership status of the UE to the source (H)eNB. The membership status of the UE may be based on the CSG ID of received from the target HeNB and the UE's CSG whitelist. On receiving the membership status from the UE, the source (H)eNB may just trust the membership status received from the UE.

In step S210, the source (H)eNB transmits a handover request message to the target HeNB. The handover request message may be transmitted to the target HeNB directly when the direct X2 interface is established between the source (H)eNB and the target HeNB. The handover request message may go through the HeNB GW/X2-proxy when the indirect X2 interface is established between the source (H)eNB and the target HeNB)

In step S220, the target HeNB decides whether the handover is acknowledged or not. If it is acknowledged, the target HeNB also pre-decides whether the target HeNB treats the UE as a member of the target HeNB or not based on its rules. That is, the target HeNB may treat the UE as a member of the target HeNB. In this case, the UE may get a priority to use resources. Or, the target HeNB may treat the UE as a non-member of the target HeNB. In this case, the UE may have limitation compared with other CSG members in the case that resources are rare.

In step S230, if the target HeNB accepts the handover, the target HeNB transmits a path switch request message to the MME. The path switch request message may include the CSG ID of the target HeNB and an access mode in order to let the MME perform the membership verification.

In step S240, the MME performs the membership verification based on the CSG ID, the access mode included in the path switch request message and the stored CSG subscription data for the UE. In step S250, the MME transmits verified UE membership information to the target HeNB. The verified UE membership information may be included in a path switch response message which is a response of the path switch request message. Or, the verified UE membership information may be transmitted included in the existing message or a new message.

There are several cases depending on whether the UE is regarded as the member of the target HeNB and the result of the membership verification and.

1) If the target HeNB has already treated the UE as the member and has given the priority to the UE to prepare resources, and the UE is verified as a real member of the target HeNB by the MME, the MME transmits the verified UE membership information that the UE is a real member of the target HeNB. The target HeNB may not change anything.

2) The target HeNB has already treated UE as a non-member and has not given the priority to the UE to prepare resources, and the UE is verified as a real member of the target HeNB by the MME, the MME transmits the verified UE membership information that the UE is a real member of the target HeNB. The verified membership information is opposite to which the target HeNB acknowledges. Accordingly, the target HeNB may treat UE as a real member of the target HeNB and give some priority to UE.

3) If the target HeNB has already treated the UE as a member and has given the priority to UE to prepare resources, and the UE is verified as a faked member of the target HeNB by the MME, the MME transmits the verified UE membership information that the UE is a non-member of the target HeNB. The verified membership information is opposite to which the target HeNB acknowledges. Accordingly, the target HeNB may modify the membership status of the UE and treat the UE as a non-member. Or the target HeNB may just kick out the UE since the UE is a cheater.

4) If the target HeNB has already treated UE as a non-member and has not given the priority to UE to prepare resources, and the UE is verified as a faked member of the target HeNB by the MME, the MME transmits the verified UE membership information that the UE is a non-member of the target HeNB. The target HeNB may not change anything.

5) If the UE has reported that the UE is not a member of target HeNB and the target HeNB has already treated the UE as a non-member and has not given the priority to UE to prepare resources, the target HeNB may not change anything.

FIG. 16 can be applied to an example of the proposed method of performing an access control according to an embodiment of the present invention. Here, the case that the target HeNB operates with the closed mode is described.

In step S200, the UE transmits a membership status of the UE to the source (H)eNB. The membership status of the UE may be based on the CSG ID of received from the target HeNB and the UE's CSG whitelist. On receiving the membership status from the UE, the source (H)eNB may just trust the membership status received from the UE. That is, the UE is regarded as a member of the target HeNB.

In step S210, the source (H)eNB transmits a handover request message to the target HeNB. The handover request message may be transmitted to the target HeNB directly when the direct X2 interface is established between the source (H)eNB and the target HeNB. The handover request message may go through the HeNB GW/X2-proxy when the indirect X2 interface is established between the source (H)eNB and the target HeNB)

In step S220, the target HeNB decides whether the handover is acknowledged or not. If it is acknowledged, the target HeNB pre-decides whether the target HeNB treats the UE as a member of the target HeNB or not as described in step S200. That is, the UE is regarded as a member of the target HeNB by the target HeNB. The target HeNB may prepare resources for the UE.

In step S230, if the target HeNB accepts the handover, the target HeNB transmits a path switch request message to the MME. The path switch request message may include the CSG ID of the target HeNB in order to let the MME perform the access control.

In step S240, the MME performs the access control based on the CSG ID included in the path switch request message and the stored CSG subscription data for the UE. In step S250, the MME transmits verified UE membership information to the target HeNB by a specific indication. The verified UE membership information may be included in a path switch response message which is a response of the path switch request message. Or, the verified UE membership information may be transmitted included in the existing message or a new message.

There are several cases depending on the result of the access control and.

1) If the UE is verified as a real member of the target HeNB, the MME transmits the verified UE membership information that the UE is allowed by the MME to the target HeNB by the specific indication. The verified UE membership information may be included in a path switch acknowledgement message. Or, the verified UE membership information may be included in the existing message or a new message. There will be no change for the UE's resources. The target HeNB may not change anything.

2) If the access control procedure fails, which means the UE is a fake member of the target HeNB, the MME transmits the verified UE membership information that the UE is not allowed by the MME to the target HeNB. The verified UE membership information may be included in a path switch acknowledgement (ACK) message. Or, the verified UE membership information may be included in a path switch non-acknowledgement (NACK) message. Or, the MME ends the handover procedure by replying with a handover rejection message to the target HeNB. Or, the verified UE membership information may be included in the existing message or a new message. The target HeNB may just kick out the UE since it is a cheater.

Figure 17A:
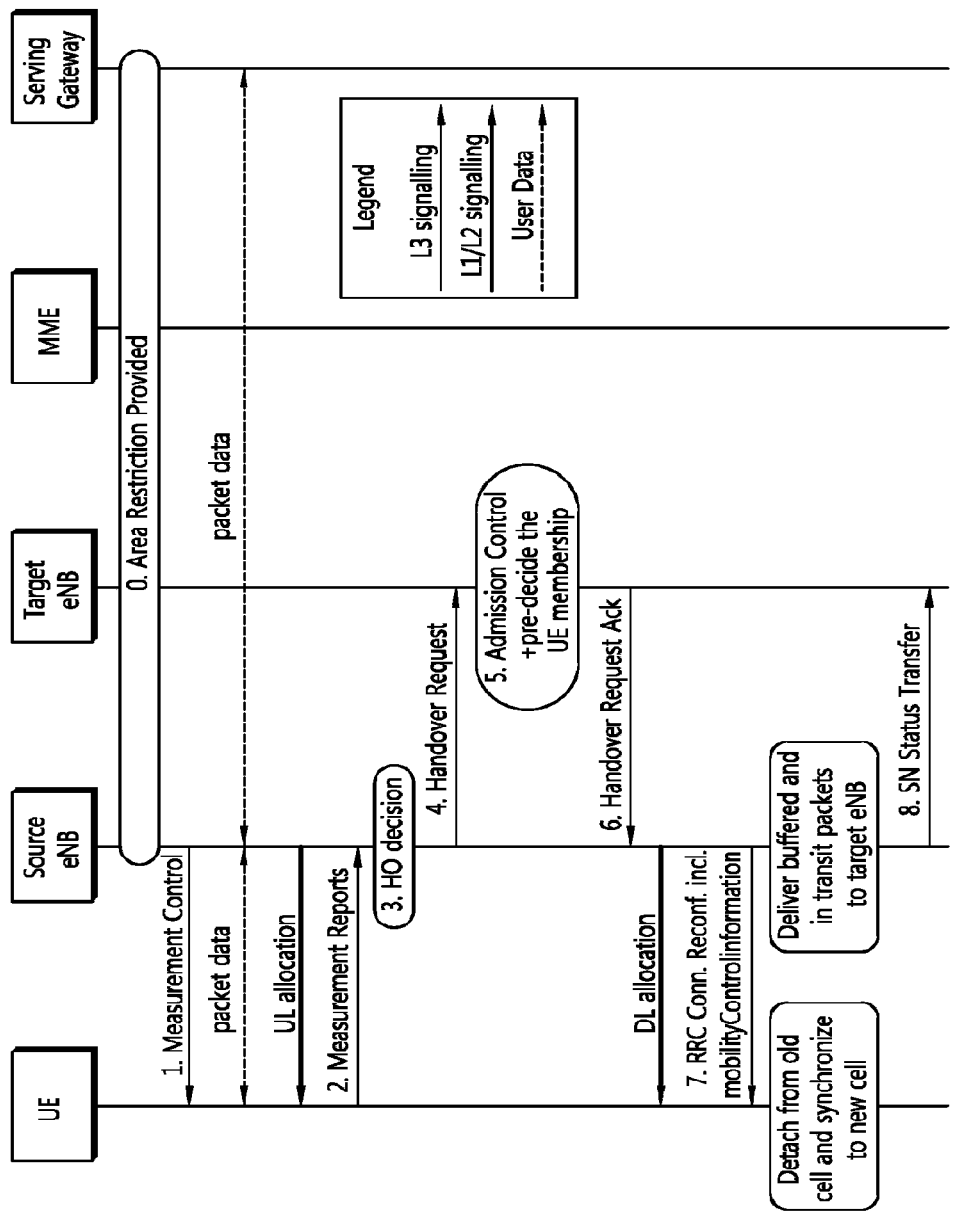

FIGS. 17a and 17b show an example of an intra-MME/S-GW handover procedure according to an embodiment of the present invention. FIG. 17 is a figure that proposed method of performing the membership verification or the access control according to the present invention is applied to an example of an intra-MME/S-GW handover procedure in FIG. 15. Hereinafter, a part which is different from the corresponding part of FIG. 15 is only described.

5. The target HeNB performs admission control. Also, the target HeNB pre-decides the UE membership of the target HeNB. This step may be explained by step S220 in FIG. 16.

12. The target HeNB transmits a path switch request message to the MME to inform that the UE has changed cell. The path switch request message may include the CSG ID of the target HeNB. The path switch request message may also include the access mode of the target HeNB if the target HeNB is a hybrid cell.

13. The MME performs the membership verification or the access control. This step may be explained by step S240 in FIG. 16.

17. The MME transmits a path switch request ACK/NACK message to the target HeNB. The path switch request ACK/NACK message may include the verified UE membership information. The present invention is not limited to only use this message. The other existing message may be utilized. This step may be explained by step S250 in FIG. 16.

FIG. 18 is a block diagram showing wireless communication system to implement an embodiment of the present invention.

A target HeNB 800 includes a processor 810, a memory 820, and an RF (radio frequency) unit 830. The processor 810 may be configured to implement proposed functions, procedures, and/or methods in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A MME 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all alternations, modifications and variations that fall within the spirit and scope of the appended claims.

The invention claimed is:

1. A method for performing, by a target home network node which operates with a hybrid mode, a handover procedure in a wireless communication system, the method comprising:
   receiving a handover request message from a source home network node via X2 interface;
   performing admission control;
   deciding whether the handover procedure is acknowledged or not;
   upon deciding that the handover procedure is acknowledged, transmitting a path switch request message including a closed group subscription (CSG) identifier (ID) of the target home network node and an access mode of the target home network node to a mobility management entity (MME);
   receiving verified user equipment (UE) membership information from the MME; and
   updating UE membership information if a current UE membership information is different from the verified UE membership information.

2. The method of claim 1, wherein the handover request message includes UE membership information reported by a UE.

3. The method of claim 2, wherein the admission control is performed based on the UE membership information reported by the UE.

4. The method of claim 2, wherein the path switch request message includes the UE membership information reported by the UE.

5. The method of claim 1, wherein performing the admission control comprises pre-deciding a UE as a member of the target home network node before transmitting the path switch request message to the MME.

6. The method of claim 5, if the verified UE membership information indicates that the UE is not a member of the target home network node, further comprising down-prioritizing the UE as a non-member of the target home network node or excluding the UE from the target home network node.

7. The method of claim 1, wherein performing the admission control comprises pre-deciding a UE as a non-member of the target home network node before transmitting the path switch request message to the MME.

8. The method of claim 7, if the verified UE membership information indicates that the UE is a member of the target home network node, further comprising adjusting the priority of the UE and preparing resources for the UE.

9. The method of claim 1, wherein the verified UE membership information is included in a path switch response message, which is a response of the path switch request message, or in an existing message or a new message.

10. The method of claim 1, wherein the source home network node is a macro evolved NodeB (eNB) or a home eNB (HeNB).

11. A target home network node which operates with a hybrid mode, comprising:
   a memory;
   a radio frequency (RF) unit; and
   a processor coupled to the memory and the RF unit, and configured to:
   control the RF unit to receive a handover request message from a source home network node via X2 interface;
   perform admission control;
   decide whether the handover procedure is acknowledged or not;
   upon deciding that the handover procedure is acknowledged, control the RF unit to transmit a path switch request message including a closed group subscription (CSG) identifier (ID) of the target home network node and an access mode of the target home network node to a mobility management entity (MME);
   control the RF unit to receive verified user equipment (UE) membership information from the MME; and
   update UE membership information if a current UE membership information is different from the verified UE membership information.

12. The target home network node of claim 11, wherein the handover request message includes UE membership information reported by a UE.

13. The target home network node of claim 12, wherein the admission control is performed based on the UE membership information reported by the UE.

14. The target home network node of claim 12, wherein the path switch request message includes the UE membership information reported by the UE.

15. The target home network node of claim 11, wherein performing the admission control comprises pre-deciding a UE as a member of the target home network node before transmitting the path switch request message to the MME.

16. The target home network node of claim 15, wherein if the verified UE membership information indicates that the UE is not a member of the target home network node, the processor is further configured to down-prioritize the UE as a non-member of the target home network node or excluding the UE from the target home network node.

17. The target home network node of claim 11, wherein performing the admission control comprises pre-deciding a UE as a non-member of the target home network node before transmitting the path switch request message to the MME.

18. The target home network node of claim 17, wherein if the verified UE membership information indicates that the UE is a member of the target home network node, the processor is further configured to adjust the priority of the UE and prepare resources for the UE.

19. The target home network node of claim 11, wherein the verified UE membership information is included in a path switch response message, which is a response of the path switch request message, or in an existing message or a new message.

20. The target home network node of claim 11, wherein the source home network node is a macro evolved NodeB (eNB) or a home eNB (HeNB).

* * * * *